(12) United States Patent
Park (10) Patent No.: US 7,012,930 B2
(45) Date of Patent: Mar. 14, 2006

(54) APPARATUS AND METHOD FOR PRE-ARBITRATING USE OF A COMMUNICATION LINK

(75) Inventor: Hee Chul Park, Seoul (KR)

(73) Assignee: LG Electronics Inc., Seoul (KR)

( * ) Notice: Subject to any disclaimer, the term of this patent is extended or adjusted under 35 U.S.C. 154(b) by 825 days.

(21) Appl. No.: 09/917,213

(22) Filed: Jul. 30, 2001

(65) Prior Publication Data

US 2002/0044565 A1    Apr. 18, 2002

(30) Foreign Application Priority Data

Jul. 29, 2000    (KR) ............................... 2000-44008

(51) Int. Cl.
*H04L 12/50* (2006.01)
(52) U.S. Cl. ..................................... 370/462; 370/438
(58) Field of Classification Search ................ 370/537, 370/538, 540, 362, 438; 710/116, 244, 107
See application file for complete search history.

(56) References Cited

U.S. PATENT DOCUMENTS

| | | | | |
|---|---|---|---|---|
| 4,253,141 A | * | 2/1981 | Suzuki et al. .................. 700/12 |
| 4,789,926 A | * | 12/1988 | Clarke ......................... 710/116 |
| 4,814,974 A | * | 3/1989 | Narayanan et al. .......... 710/244 |
| 5,263,163 A | * | 11/1993 | Holt et al. .................... 710/242 |
| 5,392,434 A | * | 2/1995 | Bryant et al. ................ 710/244 |
| 5,623,672 A | * | 4/1997 | Popat .......................... 710/240 |
| 5,754,800 A | * | 5/1998 | Lentz et al. ................. 710/116 |
| 5,778,200 A | * | 7/1998 | Gulick ......................... 710/113 |
| 5,948,078 A | * | 9/1999 | Joffe .............................. 710/9 |
| 5,956,493 A | * | 9/1999 | Hewitt et al. ................ 710/113 |
| 6,167,478 A | * | 12/2000 | Bacigalupo .................. 710/240 |
| 6,411,218 B1 | * | 6/2002 | Johnson .................... 340/825.5 |
| 6,704,821 B1 | * | 3/2004 | Scandurra et al. .......... 710/243 |
| 6,735,653 B1 | * | 5/2004 | Mathuna et al. ............ 710/105 |

OTHER PUBLICATIONS

Guohong, Zhao and Wu Hucheng, "Design of the Distributed Bus Arbiter," School of Computer Science, National University of Defense Technology, Computer Engineer & Science, Changshu, Hunan, China, vol. 20, No. 2, May 1998 (Chinese Text & English Translation.

* cited by examiner

*Primary Examiner*—Ajit Patel
*Assistant Examiner*—Steve Blount
(74) *Attorney, Agent, or Firm*—Fleshner & Kim, LLP

(57) ABSTRACT

A method of reserving access to a shared communication link by a number of devices is disclosed, having the steps of: (1) assigning a plurality, m, of counters to each of the number of devices, each counter counting from a first count value to a second count value; (2) using the values within the counting range from the first count value to the second count value to uniquely identify each of the number of devices; and (3) pausing the counting operation of a first counter of the plurality of counters, in each of the number of devices, that has the count value identifying a first of the number of devices requesting access to the shared communication link. Also disclosed, is an apparatus that supports the above-described method.

17 Claims, 6 Drawing Sheets

*MSA=MASTER, SLAVE, AND/OR ARBITRATION MEANS

| COUNT | 900 t₁ | 901 t₂ | 902 t₃ | 903 t₄ | 904 t₅ | 905 t₆ | 906 t₇ | 907 t₈ | 908 t₉ | 909 t₁₀ | 910 t₁₁ | 911 t₁₂ | 912 t₁₃ | 913 t₁₄ | 914 t₁₅ | 915 t₁₆ |
|---|---|---|---|---|---|---|---|---|---|---|---|---|---|---|---|---|
| 801~$C_0$ | 2 | 3 | 4 | 5 | 6 | 7 | 0 | 1 | 2 | 2 | 2 | 3 | 4 | 5 | 6 | 6 |
| 802~$C_1$ | 4 | 5 | 6 | 7 | 0 | 1 | 2 | 3 | 4 | 5 | 5 | 5 | 5 | 6 | 7 | 0 |
| 803~$C_2$ | 6 | 7 | 0 | 1 | 2 | 3 | 4 | 5 | 6 | 7 | 0 | 0 | 0 | 0 | 0 | 1 |

FIG. 5

APPARATUS AND METHOD FOR PRE-ARBITRATING USE OF A COMMUNICATION LINK

BACKGROUND OF THE INVENTION

1. Field of the Invention

The present invention relates to an apparatus and a method for arbitrating the tight to use a communication link and more particularly to a global bus system.

2. Background of the Related Art

Figure 1A:
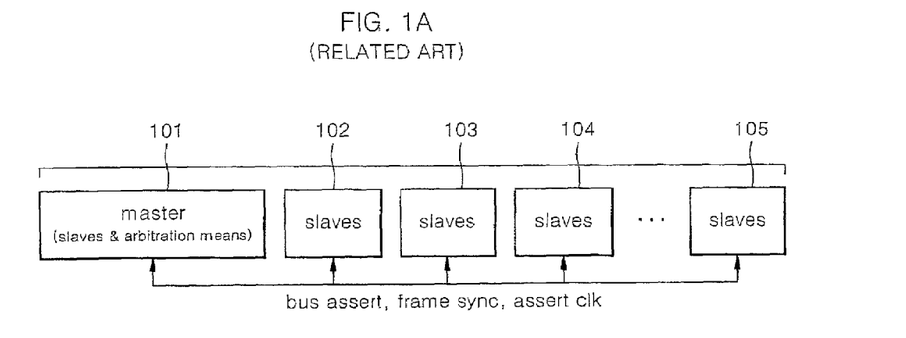
FIG. 1A illustrates a global bus system, showing an arbitration method for using the bus according to a related art round robin method.
Figure 1B:
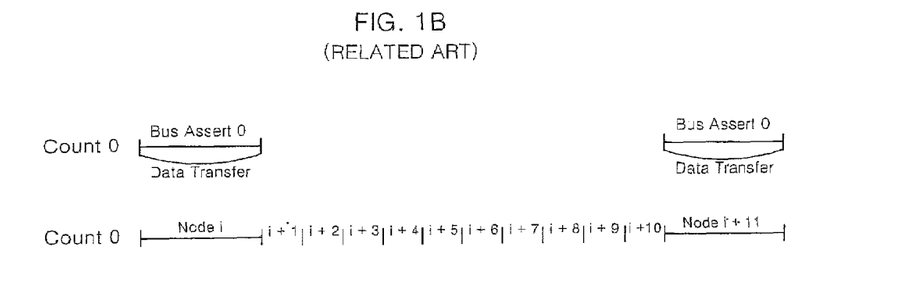
FIG. 1B is a timing diagram showing the arbitration method for using the bus in the global system of the related art round robin method.

Techniques for arbitrating a global bus system using a round robin method or a packet-bus structure ate known in the art. FIG. 1 illustrates a brief view of a global bus system for arbitrating the use of a communication bus on the basis of a related round robin method. Arbitrating the tight to use the bus through the round robin method is based on assigning a specific period of time within a time division cycle to each processor (node) sharing the global bus. Each processor may access the communication bus periodically, but only during its assigned time slot within the time division cycle. In other words, the method assigns each node to use the bus according to a given sequence and in a given time slot.

In FIG. 1A, there are n nodes (master, slave, . . . ) comprising slave nodes 102 to 105 and a master node 101, which has an arbitration means (algorithm and/or arbitration logic circuit). To arbitrate the right of the n nodes 101 to 105 to use the bus, the bus assert, frame sync and assert clock (clk) signal lines are used. The bus grant (BG), data, clock and reset signals are not needed to perform bus arbitration and, therefore, their description will be omitted. The round robin method allows the master to assign a node the right to use the bus in the given time slot of each TDM cycle. All nodes maintain a count of the active time slot value based on a frame synchronization signal.

Alternatively, a node may access the communication bus for as many time slots as necessary to complete its communication, but may only initiate the communication during its assigned time slot and while the bus is unoccupied by the communication of another node. While the node accessing the bus communicates its information, all other nodes stop counting the passage of time slot periods until the former node finishes using the bus.

FIG. 1B illustrates a timing diagram showing a method for arbitrating the tight to use the bus in the round robin system. There is one counter and the bus assert signal has the same length as the data transfer, because reservation of the bus is not available. Supposing that eleven nodes share the global bus, a first node would have access to the bus in counter periods i, i+11, i+22, etc. The period of time available for transferring and data in each time slot is equal to a stay period of the counter.

Figure 2A:
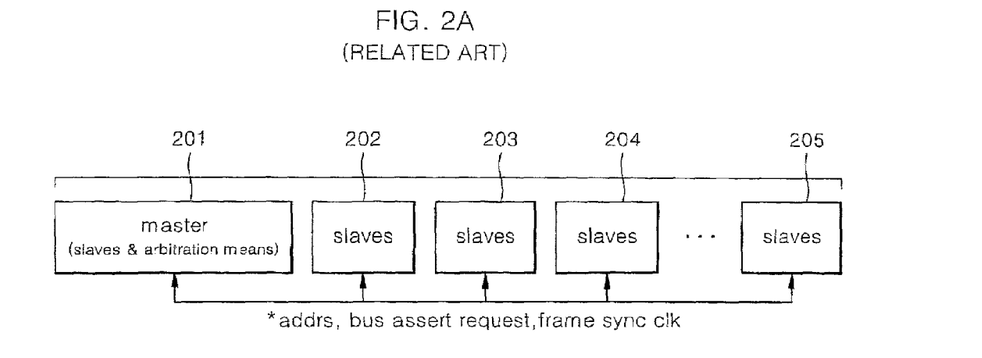
FIG. 2A illustrates a view of the arbitration method for using the bus in a related art packet bus system that is capable of pre-arbitration.

FIG. 2 illustrates a method for arbitrating the use of the bus in a pre-arbitration based packet bus system. Here, there are n nodes (master, slave, . . . ) comprising slave nodes 202 to 205 and a master node 201, which has an arbitration means (algorithm and/or arbitration logic circuit). To arbitrate the tight of the n nodes 201 to 205 to use the communication bus, the node address, bus assert request, and sync clk signal lines are used by the master. The bus grant (BG), data, clock and reset signal lines are not needed to perform bus arbitration and, therefore, their description will be omitted. In this configuration, there must be sufficient address lines for the master to individually address all nodes sharing the global bus. For example, if 16 nodes share the bus, then the address bus must have four lines to represent the 4-bit address ($2^4$).

To arbitrate the right to use the bus, the master searches all nodes in a fixed sequence and time slot to determine whether there is a bus assert request. If a node requests the use of the bus, the master permits this node to use the bus. While the node assigned to use the bus sends and receives data on the bus, the master continuously searches to determine whether there is another bus request. If another node requests the bus while the bus is actively communicating information, the master reserves the request. When the node actively using the bus finishes communicating, the master permits the next node to use the bus according to the reserved order.

Figure 2B:
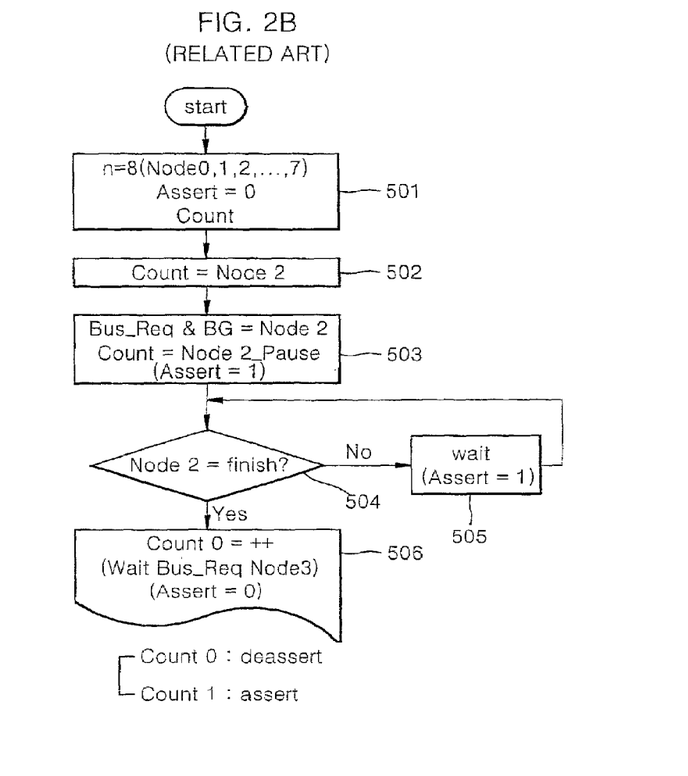
FIG. 2B illustrates a flow chart showing a related art pre-arbitration method for using the bus carried out with one bus assert request signal (Asserts) for 8 nodes.

FIG. 2B illustrates a flow chart of a pre-arbitration method employed for a global bus system having eight nodes sharing the communication bus and employing only one bus assertion line. In steps 501 and 502, an initial condition for arbitrating the bus shared by 8 nodes (masters and slaves) is set using one, m=1, bus assert request signal (Bus Assert 0).

Each node has one counter (Count 0 or Count) operating in conjunction with one bus assert line (Bus Assert 0). The bus assert line acts to pause and restart the counter. In this example, the counter (Count 0) is initialized to a value of two to indicate the time slot assigned to node 2.

In step (503), node 2 asserts a bus request (Bus_Req), and a bus grant (BG) is performed by the master in response to the request. Counter 0 within each node receives the bus assert request during the counter period that counter 0 (Counter)contains a value of two, to indicate node 2. When the bus assert request is received, the count of counter 0 within each node is temporarily paused (Count 0=Node 2_Pause).

In step (504), it is determined whether the bus assert of node 2 is finished. If the bus assert of node 2 is not finished, the bus assert request of node 3 waits until bus control of node 2 is finished, using waiting step (505). If the bus assert of node 2 is finished, node 3 is permitted to initiate a bus assert after counter 0 restarts its count.

The related art global bus system of the round robin method shown in FIG. 1A and the packet bus structure capable of pre-arbitration shown in FIG. 2A have the following problems.

In the case of the global bus system of the round robin method, the connection between the nodes is simple. However, because there is only one counter as shown in FIG. 1B, the counter cannot receive and reserve a bus assert request of other nodes, while one node controls bus. Thus, the global bus system is inefficient in arbitrating the use of the bus.

The arbitration method carried out in the packet bus structure, shown in FIG. 2A, can pre-arbitrate. However, because the master requires sufficient address lines to uniquely identify each of the nodes, when a large number of the nodes is used, the connection of the nodes is complicated and a circuit structure for arbitrating the use of bus becomes complex.

SUMMARY OF THE INVENTION

An object of the invention is to solve at least the above problems and/or disadvantages and to provide at least the advantages described hereinafter.

It is an object of the present invention to provide a pre-arbitration apparatus for using a bus and a method thereof capable of pre-arbitrating a global bus system.

It is another object of the present invention to provide a pre-arbitration apparatus for using a bus and a method thereof in a global bus system capable of arbitrating the right to use the bus while setting at least two or more bus asserts and allowing each node to perform a count corresponding to the bus asserts, directly.

It is a further object of the present invention to provide a pre-arbitration apparatus for using a bus and a method thereof in a global bus system capable of arbitrating effectively the use of the bus with a simple circuit structure. This is accomplished by performing a plurality of counts in each node, which have at least two or more bus assert lines, searching for a bus assert request of other nodes, and performing a temporary pause and restart of the counts according to the bus assert requests of other nodes.

The objects of the present invention can be achieved in whole or in part by a method of reserving access to a shared communication link by a number, n, of devices, comprising: (1) assigning a plurality, m, of counters to each of the number of devices, each counter counting from a first count value to a second count value; (2) using the values within the counting range from the first count value to the second count value to uniquely identify each of the number of devices; (3) pausing a counting operation of a first counter of the plurality of counters, in each of the number of devices, that has the count value identifying a first device of the number of devices, which requests access to the shared communication link.

The objects of the present invention can be achieved in whole or in part by a method of reserving access to a shared communication link by a number, n, of devices, comprising: (1) assigning a plurality, m, of counters to each of the number of devices, each counter counting from a first count value to a second count value; (2) using the values within the counting range from the first count value to the second count value to uniquely identify each of the number of devices; and (3) for each $i^{th}$ request of up to m requests to access the shared communication link concurrently:

A) pausing the counting operation of an $i^{th}$ counter of the plurality of counters, in each of the number of devices, that has the count value identifying an $i^{th}$ one of the number of devices, which requests access to the shared communication link; and B) generating a bus access request when the $i^{th}$ device develops a need to access the communication link and the $i^{th}$ counter has the count value identifying the $i^{th}$ device.

The objects of the present invention can be achieved in whole or in part by an apparatus for reserving access to a shared communication link by a number, n, of devices, comprising; (1) a plurality, m, of counters assigned to each of the number of devices, each counter counting from a first count value to a second count value and using the values within the counting range to uniquely identify each of the number of devices; and (2) a plurality of bus assertion signals each used by the number of devices to request access to the communication link, with each of the plurality of bus assertion signals coupled to a separate one of the plurality of counters associated with each of the number of devices. A first communication link access request is generated by a first of the number of devices, when the first device develops a need to access the communication link and a first of the plurality of counters has the count value identifying the first device. The first access request is communicated by a first of the plurality of bus assertion signals to a subset of the number of devices. The first counter associated with each of the subset of devices discontinues its respective counting operation in response to the first bus assertion signal and the first counter associated with the first device discontinues its counting operation in response to the communication of the first bus assertion signal.

The objects of the present invention can be achieved in whole or in part by an apparatus for reserving access to a shared communication link by a number, n, of devices, comprising: (1) a counter means, having a plurality, m, of counters assigned to each of the number of devices, for counting from a first count value to a second count value with each of the plurality of counters, wherein the values within the counting range uniquely identify each of the number of devices; (2) a control means for pausing the counting operation of an $i^{th}$ counter of the plurality of counters, in each of the number of devices, that has the count value identifying an $i^{th}$ one of the number of devices, which requests access to the shared communication link; and (3) an access requesting means for generating a bus access request when the $i^{th}$ device develops a need to access the communication link and the $i^{th}$ counter associated with the $i^{th}$ device holds a value uniquely identifying the $i^{th}$ device.

The objects of the present invention can be achieved in whole or in part by a pre-arbitration apparatus for using a bus, which sets at least two or more counters for performing bus asserts and counts to the bus asserts in a bus structure including n nodes having a master, comprising an arbitration means, and slaves to arbitrate the use of the bus at the same time.

The objects of the present invention can be achieved in whole or in part by a pre-arbitration method for using a bus to arbitrate the use of the bus when at least two or more nodes access the bus at the same time, the method comprising the steps of: (1) performing a count of at least two or more nodes to at least two bus asserts to arbitrate the bus assert in each node; and (2) temporarily stopping the count of the corresponding node in response to a bus assert when one of the two nodes equests the use of the bus and reserving the right to use the bus.

In order to arbitrate the right to use the bus when at least two or more nodes attempt to access the bus simultaneously, a preferred embodiment of the pre-arbitration reservation method of the present invention includes: (a) performing a count corresponding to at least two or more nodes, with each node interconnected by at least two bus asserts; (b) temporarily stopping the count of a corresponding counter within each node when the value of the count identifies the node seeking access to the bus and reserving to the identified node the right to use and control the bus; (c) having the other counters within each node continue their respective counting operations until another node requests access to the bus in the manner described in step (b); and (d) permitting the reserved node to access the bus when the node or nodes having prior reservations complete their use of the bus.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3A:
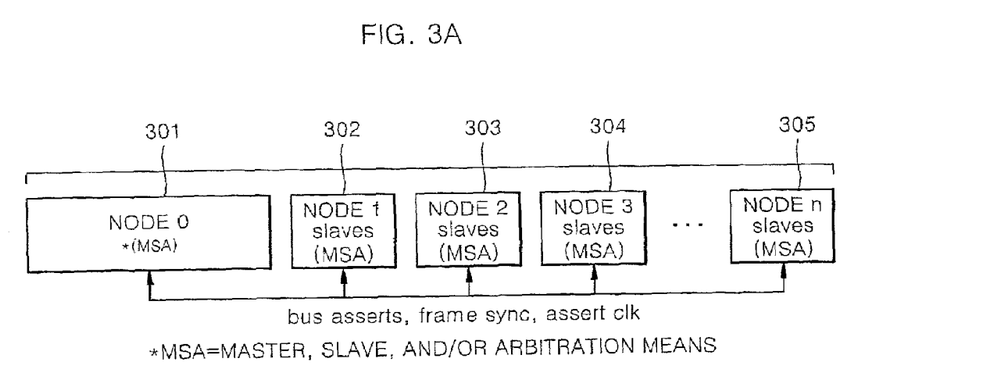
FIG. 3A illustrates a global bus system, showing an arbitration method for using the bus according to a preferred embodiment of the present invention.

FIG. 3A is a general view of a global bus system according to a preferred embodiment of the present invention. As shown there are n nodes 301–305, where each node can comprise a master having an arbitration means (algorithm and/or arbitration logic circuit) and also serve as slaves. To arbitrate the use of the bus for the n nodes 301 to 305, at least two or more bus asserts, frame sync and an assert clk for the bus asserts are used. The bus grant (BG) signal from the arbitration means (in the master of one of the nodes), responding to bus assert request of the n nodes 301 to 305, the data actually transferred from the node permitted to use the bus, the clock for sending and receiving data, and a control signal, such as reset, are not needed to perform the bus arbitration and, therefore, their description will be omitted.

The present invention employs a plurality of bus asserts in a global bus system. As the number of bus asserts is increased, the number of bus access reservations can be increased. For example, when there are m bus asserts and each node has m counters, each of which corresponds to a separate bus assert line, it is possible to reserve the use of the bus to a maximum of m-1 nodes. In a preferred embodiment of the present invention, the frame sync signal or assert clk signal for synchronizing the corresponding counters within nodes 301 to 305 ate used in the conventional manner.

Nodes 301 to 305 have a plurality of counters corresponding to an equal plurality of bus asserts used by each node. The counters have control logic for controlling the temporary pause and restart of their counting operations. Counters and counter control circuits can be easily embodied in this art and, therefore, their description will be omitted. Furthermore, the counters and the counter control circuit may be embodied through a processor algorithm.

The m bus assert lines (Bus Assert 0~Bus Assert m-1) are used for arbitration of the bus for the n nodes 301 to 305. There are m counters (Count 0, 1, 2, 3, m-1) for processing the m bus asserts. Because each node has m counters and the it counter of the set of counters (0, 1, . . . , m-1) within each node corresponds to the $i^{th}$ counter of all other of the n nodes, each node has the same state knowledge regarding the reserved use of the bus at all times. When one node occupies the bus, a maximum of m-1 nodes can be pre-arbitrated.

Figure 5:
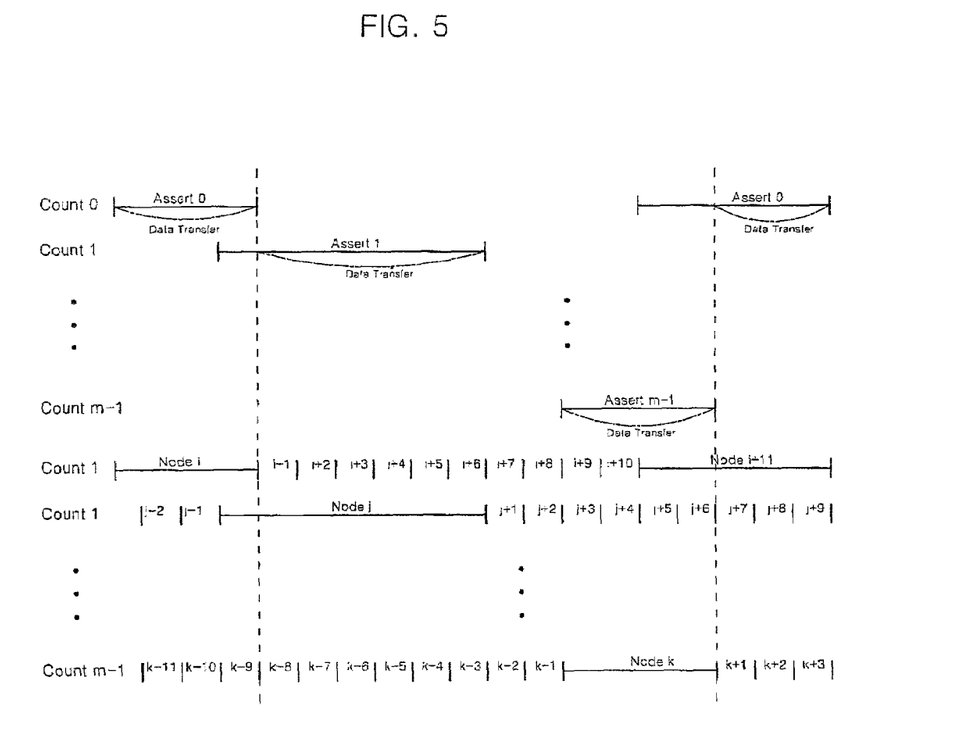
FIG. 5 illustrates a timing diagram showing a pre-arbitration method for using the bus according to a preferred embodiment of the present invention.

If a certain node generates a bus assert, the counter of each node corresponding to the bus assert line stops its count (at this time, the count value of the corresponding counter necessarily contains a value indicating the node requesting the bus). The bus arbitration means then permits the node requesting the use of bus to perform its data transfer. As shown in FIG. 5, a bus assert may be carried out when another node occupies the bus, but the actual data transfer is performed only when the occupation of the bus by the other node is finished. That is, the initiation of a bus reservation does not always coincide with the initiation of data transfer. A reservation may occur beforehand when other node occupies the bus.

If a second node generates a bus assert while a first node uses the bus, the counter corresponding to the bus assert line used by the second node stops its count and reserves the bus (at this time, count value indicates node requesting the new bus assert).

The bus arbitration means provides the bus to the node having the earliest reservation, once the node currently using the bus finishes its use. There, the paused counters containing the value of the node that finished its use of the bus restart their counting. In this way, even though a certain node uses the bus, the bus asserts of m-1 other nodes can be reserved.

The pre-arbitration method for using the bus according to a preferred embodiment of the present invention will be described in greater detail using the following examples.

When a certain node i ($1 \leq i \leq n$) controls the bus and sends and receives data, the count value of counter 0 is temporarily stopped and contains the value i, which identifies node i. If counter 1 of the m-1 other counters (Count 1~Count m-1) receives the bus assert of node j ($1 \leq j \leq n$), the count value of counter 1 is temporarily stopped at the value identifying node j, and thereby node j's right to use the bus is reserved. Node waits until node i is finished with the bus before accessing it.

When node i is finished, counter 0 restarts its count (Count 0=Node i+1, Node i+2, . . . Node i-2, Node i-1, Node i, Node i+1, Node i+2, . . . ). The bus arbitration means permits the use of the bus to the reserved node j. When node j is finished using the bus, counter 1 of each node restarts its count (Count 1=Node j+1, Node j+2, . . . Node j-2, Node j-1, Node j, Node j+1, Node j+2, . . . ). Such action is similarly performed for counter m-1 (Count m-1) [Count m-1=Node k+1, Node k+2, . . . Node k-2, Node k-1, Node k, Node k+1, Node k+2, . . .]($1 \leq k \leq n$) as shown in FIG. 5.

Figure 4A:
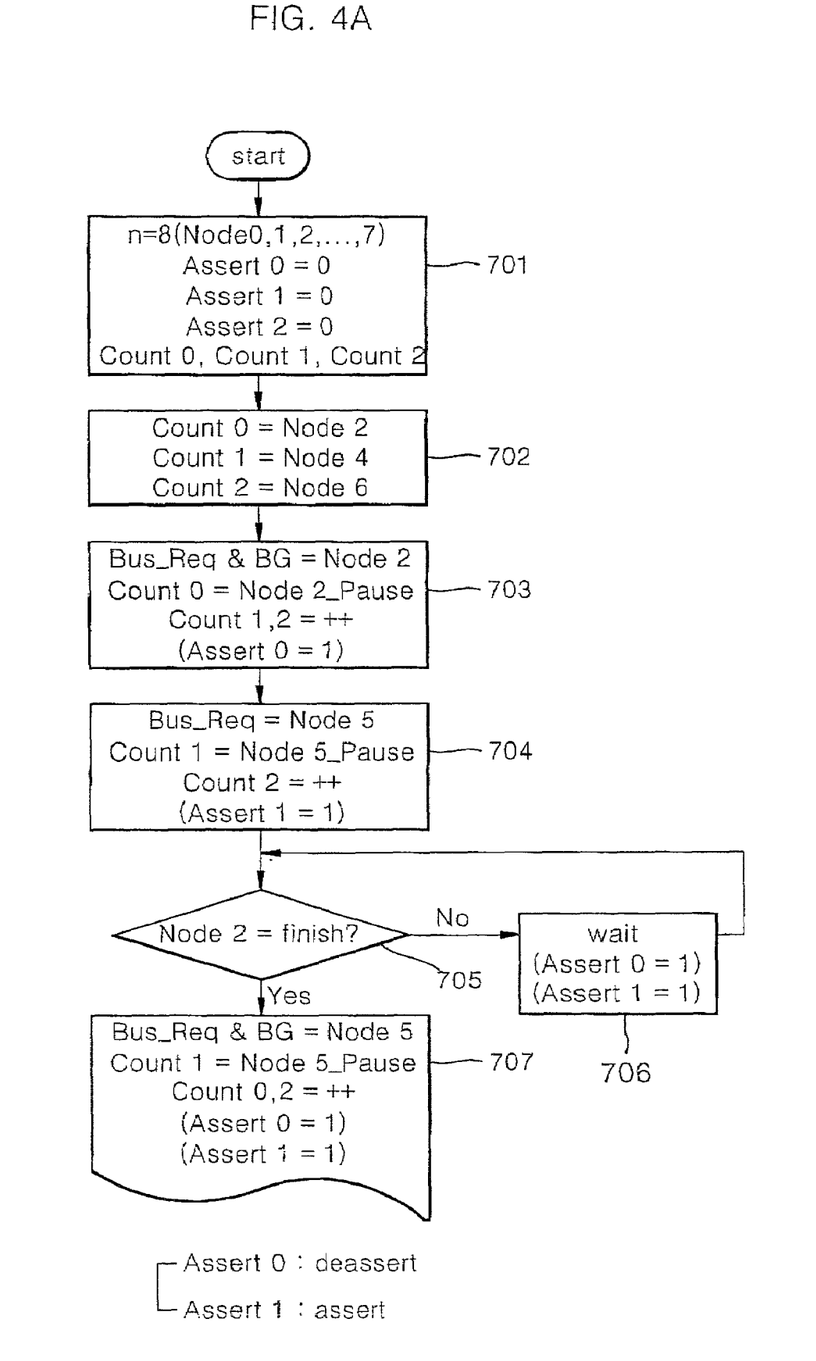
FIG. 4A illustrates a flow chart showing the pre-arbitration method for using the bus according to a preferred embodiment of the present invention, carried out with three bus assert request signals (Asserts) for 8 nodes.

For example, suppose there are three bus assert lines, m=3, (Bus Assert 0, 1, 2 and Count 0, 1, 2) for 8 nodes (n=8) (Node 0, 1, 2, 3, . . . , 7). Further suppose that counter 0 starts its count with a value of two to identify node 2, counter 1 starts its count with a value of four to identify node 4, and counter 2 starts its count with a value of six to identify node 6. If the bus is requested by node 4 while node 2 controls the bus, then the pre-arbitration and reservation method will operate as illustrated in FIG. 4A.

In steps 701 and 702, an initial condition is set. That is, the arbitration of the use of the bus to the 8 nodes (masters and slaves) is performed. For this, m=3, i.e., three bus asserts (Bus Assert 0, 1, 2) are used (when a certain node occupies the bus, two nodes can be reserved).

Each node has three counters (Count 0, 1, 2) corresponding to the three bus asserts (Bus Assert 0, 1, 2) and performs the temporary pause and restart of each counter as necessary. Each counter starts counting according to a frame sync set against an obstacle in the given node. In this example, counter 0 starts its count with a value of two to identify node 2, counter 1 identifies node 4, and counter 2 identifies node 6.

In step (703), when node 2 requests the use of the bus (Bus_Req), the bus grant BG is carried out. Counter 0 of each node receives a bus assert from node 2 and temporarily stops its count (Count 0=Node 2_Pause), though the other counters (Count 1, 2) continue their respective counts (Count 1, 2=++).

In step (704), node 5 requests the use of the bus while node 2 is currently using it. If counter 1 within each node receives the request, each temporarily stops its count (Count 1=Node 5_Pause). Counter 2 continues its count within each node.

In a step (705), a determination is made whether node 2 has finished using the bus. If not, the bus assert request of node 5 waits until node 2 finishes its use of bus, by passing through a sequence of waiting steps (706). If node 2 is finished using the bus, node 5 is permitted gains access to the bus in step (707) (Bus_Req & BG=Node 5) and counter 0 of each node resumes its count.

In step (702), the number of each node indicates a start time slot of the count value at the start time. The reservation efficiency is increased by promptly searching for a request of the bus by the plurality of counts. For this, the nodes start not from the same place but separate places.

The operation of the invention may be described in greater detail with reference to FIG. 3B, which illustrates an exemplary global bus system shared by eight nodes 800 in accordance with a preferred embodiment of the present invention. Each of the eight nodes 800 share a common global bus 807 that is used to pass information between the nodes. To arbitrate the use of the shared bus 807 among the nodes 800 that may potentially have conflicting requests to use the bus, the illustrated example employs three bus assertion lines 804–806. Each bus assertion line 804–806 interconnects one of the there counters 801–803 of each node 800. Therefore, each of the three counters 801–803 within each node 800 corresponds to a separate bus assertion line 804–806.

Each counter 801–803 sequentially counts the values between one and the total number of nodes sharing the global bus. In this example, counters 801–803 count sequentially from one to eight. When the counters 801–803 reach a value of eight, they begin the count again with a value of one. This process of repeatedly counting from one to eight is repeated continuously during the operation of the arbitration device.

Each node 800 has a $C_0$ counter 801, a $C_1$ counter 802, and a $C_2$ counter 803. The $C_0$ counters 801 of each node 800 are all interconnected by the bus assertion line 804. Similarly, the $C_1$ counters 802 of each node 800 are all interconnected by bus assertion line 805 and the $C_2$ counters 803 of each node 800 are all interconnected by bus assertion line 806. The $C_0$ counter 801 of each node 800 preferably maintains a synchronized counting sequence with all other $C_0$ counters 801. In other words, each of the $C_0$ counters 801 preferably has the same value as all other $C_0$ counters 801. The same holds true for the $C_1$ counters 802 and the $C_2$ counters 803. All $C_1$ counters 802 preferably have the same value at a given point in time and all $C_2$ counters 803 preferably have the same value at a given point in time. However, each set of associated counters $C_0$, $C_1$, and $C_2$ is initialized to a different count value upon receiving a synchronization signal (not shown). In this example, counter $C_0$ 801 is initialized to a value of two, counter $C_1$ is initialized to a value of four, and counter $C_2$ is initialized to a value of six.

Figure 3B:
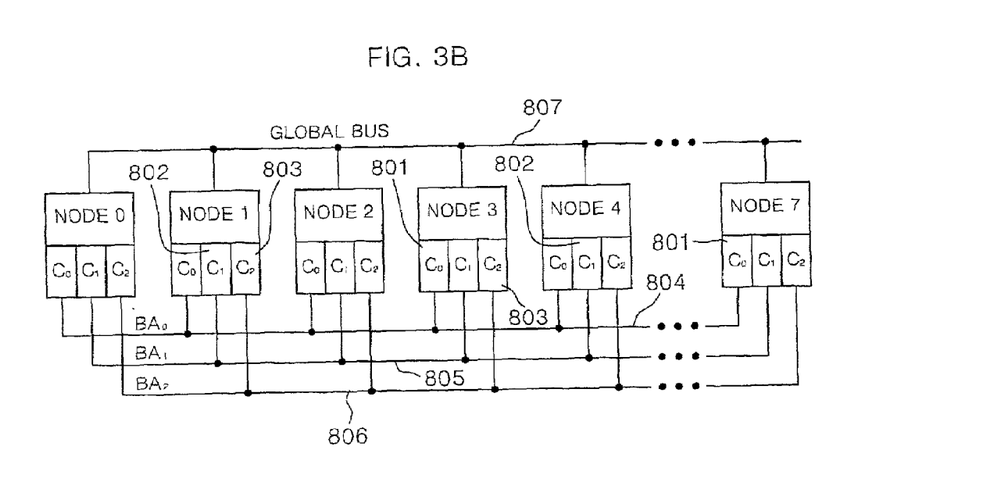
FIG. 3B illustrates an exemplary global bus system shared by eight nodes in accordance with a preferred embodiment.
Figure 4B:
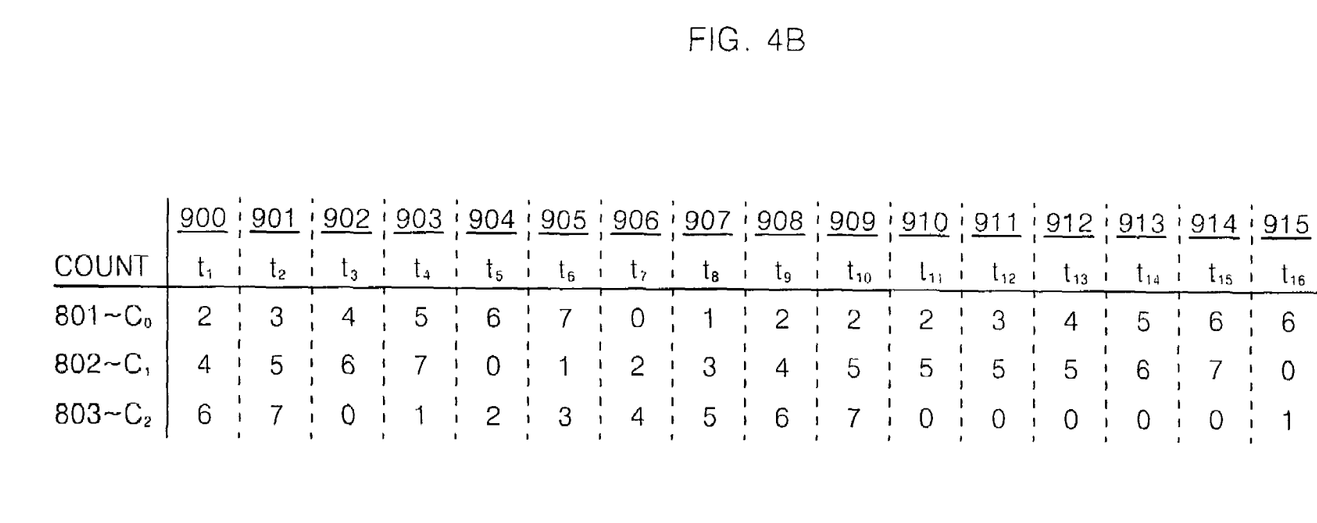
FIG. 4B illustrates the values stored by the counters illustrated in FIG. 3B during an exemplary use of the device illustrated in FIG. 3B.

FIG. 4B illustrates the values stored by each counter 801–803 during an exemplary use of the apparatus illustrated in FIG. 3B. The values stored by each of the three counters $C_0$, $C_1$, and $C_2$ 801–803 are shown for sixteen counting periods $t_1$–$t_{16}$ 900–915. Each counter 801–803 is initialized to its starting value in period $t_1$ 900. For periods $t_1$–$t_8$ 900–907, none of the nodes 800 requests use of the global bus 807. Therefore, each of the counters $C_0$, $C_1$, and $C_2$ count upwards through their sequence during these counting periods. Counter $C_0$ 801 counts through the sequence {2, 3, 4, 5, 6, 7, 0, 1}, counter $C_1$ 802 counts through the sequence {4, 5, 6, 7, 0, 1, 2, 3}, and counter $C_2$ 803 counts through the sequence {6, 7, 0, 1, 2, 3, 4, 5}.

Somewhere between time period $t_8$ 907 and period $t_9$ 908, node 2 had an emerging need to use the global bus 807. The first counter 801–803 to reach a value of two during this period was counter $C_0$ 801 and this value was reached by the counter 801 in period $t_9$ 908. When a counter has reached a value that identifies a node requesting access to the global bus 807 (e.g., a counter value of one identifies node 1 and a counter value of four identifies node 4), then the node may request access to the global bus 807 on the bus assertion line 804–806 that corresponds (i.e., connects) to the counter whose count value identifies the requesting node. Here, node 2 requests access to the global bus 807 and counter $C_0$ 801 was the first to teach a value of two. Therefore, node 2 sends a bus request on the bus assertion line connected to counter $C_0$ 801, which is line $BA_0$ 804 in this example.

Every node 800 sharing the global bus 807 receives this bus request and halts the incremental count of counter $C_0$ 801 at a value of two. Every node 800 has the same knowledge, now, regarding which node has requested access to the global bus 807 and all nodes other than node 2 will refrain from using the bus 807 until node 2 has finished using it. Node 2 accesses the bus for three counting periods $t_9$–$t_{11}$ 908–910 and counter $C_0$ 801, therefore, does not increment its value until period $t_{12}$ 911.

While node 2 is accessing the global bus 807, node 5 develops a need to access the bus. The next counter 801–803 to reach a count value of five is counter $C_1$ 802. When counter $C_1$ 802 reaches a value of five, node 5 issues a bus request on the bus assertion line, $BA_1$ 805, connected with is counter. All of the nodes 800 sharing the global bus 807 receive this request and pause the incremental counting operation of their respective $C_1$ counters 802. Every $C_1$ counter 802 now has a value of five in its register during time period $t_{10}$ 909. Since node 2 is still using the global bus 807, node 5 is given a reservation to access the bus immediately after node 2 relinquishes it. Both counters $C_0$ 801 and $C_1$ 802 have paused their incremental counting operations.

At some point between time period $t_8$ 907 and period $t_{11}$ 910, node 8 developed a need to access the global bus 807. Counter $C_2$ 803 was the first counter to reach a value of eight during this time. When counter $C_2$ 803 reaches this value, node 8 issues a bus request on the bus assertion line, $BA_2$ 806, connected with this counter. All of the nodes 800 sharing the global bus 807 receive this request and pause the incremental counting operation of their respective $C_2$ counters 803. Every $C_2$ counter 803 now has a value of eight in its register for period $t_{11}$ 910. Since node 2 is still using the global bus 807 and node 5 has the most immediate reservation, node 8 is given a reservation to access the bus that is subordinate to node 5's reservation. Immediately after node 5 relinquishes the global bus 807, node 8 will gain access to it. In period $t_{11}$ 910, then, all of the counters $C_0$–$C_2$ 801–803 have paused their incremental counting operations.

In time period $t_{12}$ 911, node 2 relinquishes the global bus 807 to node 5 and counter $C_0$ 801 resumes its incremental counting operation. In time period $t_{14}$ 913, node 5 relinquishes the global bus 807 to node 8 and counter $C_1$ 802 resumes its incremental counting operation. During period $t_{15}$ 914, node 6 develops a need to access the global bus 807. Since counter $C_0$ 801 reaches a value of six first, node 6 issues a bus request on bus assertion line $BA_0$ 804 in period $t_{15}$ 914. All $C_0$ counters 801 pause their respective counting operations upon receiving this request Node 6 has an immediate reservation to access the global bus 807 and does so when node 8 relinquishes the bus in period $t_{16}$ 915.

Each node must keep track of the order in which the reservations are made so that access to the global bus may be provided accordingly. Alternatively, the above-described operation of the system of FIG. 3B may be modified such that the next-most subordinate reservation must be stored to the counter having the next higher subscript value, until the highest subscript value is reached and a wrap-around to the lowest subscript value is necessary. These and other obvious methods of prioritizing the reservations into the counters fall within the scope of the invention.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of reserving access to a shared communication link by a number, n, of devices, comprising:
   assigning a plurality, m, of counters to each of said number of devices, each counter counting from a first count value to a second count value;
   using the values within the counting range from said first count value to said second count value to uniquely identify each of said number of devices;
   pausing a counting operation of a first counter of said plurality of counters, in each of said number of devices, that has the count value identifying a first device of said number of devices, which requests access to said shared communication link; and
   pausing a counting operation of a second counter of said plurality of counters, in each of said number of devices, that has the count value identifying a second device of said number of devices, which requests access to said shared communication link concurrently with said first device.

2. The method of claim 1, further comprising generating a first communication link access request when said first device develops a need to access said communication link and said first counter has the count value identifying said first device.

3. The method of claim 2, wherein said first device generates said first communication link access request.

4. The method of claim 3, further comprising providing access to said communication link for said first device.

5. The method of claim 4, further comprising restarting said first counter when said first device relinquishes access to said communication link.

6. The method of claim 1, further comprising generating a second communication link access request when said second device develops a need to access said communication link and said second counter has the count value identifying said second device.

7. The method of claim 6, wherein said second device generates said second communication link access request.

8. The method of claim 7, further comprising providing said second device a reservation to access to said communication link, which reserved access is gained immediately after said first device relinquishes access.

9. A method of reserving access to a shared communication link by a number, n, of devices, comprising:
   assigning a plurality, m, of counters to each of said number of devices, each counter counting from a first count value to a second count value;
   using the values within the counting range from said first count value to said second count value to uniquely identify each of said number of devices;
   pausing a counting operation of a first counter of said plurality of counters, in each of said number of devices, that has the count value identifying a first device of said number of devices, which requests access to said shared communication link;
   assigning each of said plurality, m, of counters to a separate one of an equal number, m, of bus assertion signals used by said number of devices to request access to said common bus;
   generating a first communication link access request when said first device develops a need to access said communication link and said first counter has the count value identifying said first device; and
   communicating said first access request to a subset of said number of devices using a first bus assertion signal, of said number of bus assertion signals, assigned to said first counter.

10. The method of claim 9, further comprising:
    pausing said counting operation of a second counter of said plurality of counters, in each of said number of devices, that has the count value identifying a second device of said number of devices, which requests access to said shared communication link concurrently with said first device;
    generating a second communication link access request when said second device develops a need to access said communication link and said second counter has the count value identifying said second device; and
    communicating said second access request to a subset of said number of devices using a second bus assertion signal, of said number of bus assertion signals, assigned to said second counter.

11. The method of claim 10, further comprising providing said second device a reservation to access to said communication link immediately after said first device relinquishes access.

12. A method of reserving access to a shared communication link by a number, n, of devices, comprising:
    assigning a plurality, m, of counters to each of said number of devices, each counter counting from a first count value to a second count value;

using the values within the counting range from said first count value to said second count value to uniquely identify each of said number of devices; and for each $i^{th}$ request of up to m requests to access said shared communication link concurrently:

pausing a counting operation of an $i^{th}$ counter of said plurality of counters, in each of said number of devices, that has the count value identifying an $i^{th}$ one of said number of devices, which requests access to said shared communication link;

continuing a counting operation of all other counters of the plurality of counters, except the paused $i^{th}$ counter, in each of said number of devices; and generating a bus access request when said $i^{th}$ device develops a need to access said communication link and said $i^{th}$ counter has the count value identifying said $i^{th}$ device.

13. The method of claim 12, further comprising providing access to said communication link for a first device of said number of devices that requests access to said communication link concurrently.

14. The method of claim 13, further comprising providing a prioritized reservation to access to said communication link to all other of the up to m-1 devices that request access to said communication link concurrently.

15. An apparatus for reserving access to a shared communication link by a number, n, of devices, comprising:

a plurality, m, of counters assigned to each of said number of devices, each counter counting from a first count value to a second count value and using the values within the counting range from said first count value to said second count value to uniquely identify each of said number of devices; and a plurality of bus assertion signals each used by said number of devices to request access to said communication link, each of said plurality of bus assertion signals coupled to a separate one of said plurality of counters associated with each of said number of devices, wherein a first communication link access request is generated by a first of said number of devices when said first device develops a need to access said communication link and a first of said plurality of counters has the count value identifying said first device;

said first access request is communicated by a first of said plurality of bus assertion signals to a subset of said number of devices;

said first counter associated with each of said subset of devices discontinues its respective counting operation in response to said first bus assertion signal;

said first counter associated with said first device discontinues its counting operation in response to said communication of said first bus assertion signal; and a second counter of said plurality of counters in each device continues its respective counting operation until another bus assertion signal is received.

16. The apparatus of claim 15, wherein said first device is provided access to said communication link in response to said communication of said first bus assertion signal.

17. An apparatus for reserving access to a shared communication link by a number, n, of devices, comprising:

a counter means, having a plurality, m, of counters assigned to each of said number of devices, for counting from a first count value to a second count value with each of said plurality of counters, wherein the values within the counting range from said first count value to said second count value uniquely identify each of said number of devices;

a control means for pausing said counting operation of an $i^{th}$ counter of said plurality of counters, in each of said number of devices, that has the count value identifying an $i^{th}$ one of said number of devices, which requests access to said shared communication link; and an access requesting means for generating a bus access request when said $i^{th}$ device develops a need to access said communication link and said $i^{th}$ counter associated with said $i^{th}$ device holds a value uniquely identifying said $i^{th}$ devices, wherein the counter means continues a counting operation of all other counters of the plurality of counters, except the paused $i^{th}$ counter, in each of said number of devices.

* * * * *